(12) United States Patent
Ghamsari et al.

(10) Patent No.: US 12,014,322 B2
(45) Date of Patent: Jun. 18, 2024

(54) UPDATING AND VALIDATING DATA STORED IN A DATABASE

(71) Applicant: Capital One Services, LLC, McLean, VA (US)

(72) Inventors: Avid Ghamsari, Frisco, TX (US); Qiaochu Tang, The Colony, TX (US); Geoffrey Dagley, Mckinney, TX (US)

(73) Assignee: Capital One Services, LLC, McLean, VA (US)

( * ) Notice: Subject to any disclaimer, the term of this patent is extended or adjusted under 35 U.S.C. 154(b) by 316 days.

(21) Appl. No.: 17/514,275

(22) Filed: Oct. 29, 2021

(65) Prior Publication Data

US 2023/0132457 A1    May 4, 2023

(51) Int. Cl.
*G06Q 10/087*    (2023.01)
*G06Q 30/0201*    (2023.01)
*G06Q 30/0601*    (2023.01)

(52) U.S. Cl.
CPC ....... *G06Q 10/087* (2013.01); *G06Q 30/0201* (2013.01); *G06Q 30/0631* (2013.01)

(58) Field of Classification Search
CPC ............. G06Q 10/087; G06Q 30/0201; G06Q 30/0631; G06F 16/2365; G06F 16/986
See application file for complete search history.

(56) References Cited

U.S. PATENT DOCUMENTS

| | | |
|---|---|---|
| 10,387,951 B2 | 8/2019 | Scopazzi |
| 10,424,013 B2 | 9/2019 | Bennett et al. |
| 10,565,594 B1 | 2/2020 | Moore et al. |
| 2009/0150345 A1* | 6/2009 | Van Luchene ........ G06F 16/958 |
| 2015/0106078 A1* | 4/2015 | Chang ..................... G06F 16/35 |
| | | 704/9 |
| 2018/0204281 A1 | 7/2018 | Painter et al. |

* cited by examiner

*Primary Examiner* — A. Hunter Wilder
(74) *Attorney, Agent, or Firm* — Sterne, Kessler, Goldstein & Fox P.L.L.C.

(57) ABSTRACT

Disclosed herein are system, method, and computer program product embodiments for validating and updating data in a database. In an embodiment, a server may receive an HTML, file including content of a third-party website controlled by a third party from a web-component. The content may include a first set of data associated with an item. The web-component may be configured to extract the content of the third party website and generate the HTML file in response to executing code embedded in the third-party website. The server may retrieve a second set of data associated with the item available at the third-party from the database. The server may identify a difference between the mapped first set of data and the second set of data and execute an action in the database to update to the second set of data.

11 Claims, 6 Drawing Sheets

UPDATING AND VALIDATING DATA STORED IN A DATABASE

BACKGROUND

Entities frequently maintain inventory records of items available at various third-parties. These entities rely on the third-parties to periodically send the inventory records to the respective entity so that the respective entity may update their database records. However, the third-parties may cause delays in providing the inventory records and may even provide inaccurate records. As a result, the respective entity may be unable to maintain accurate inventory records of the items available at various third parties. Therefore, conventional systems that maintain inventory records of items available at various third parties may be error-prone, and methods for updating such records may be time-consuming and unreliable.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
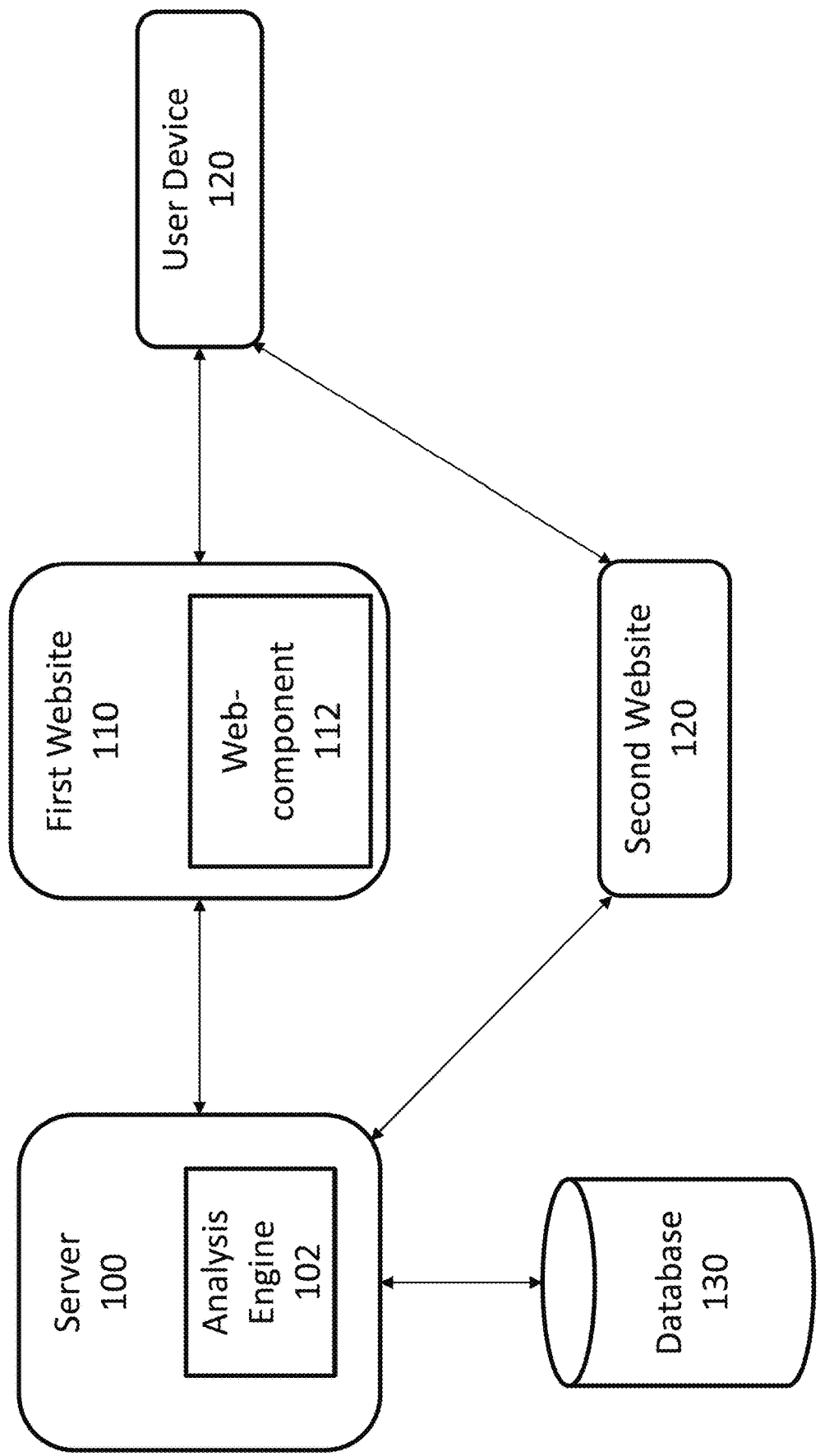
FIG. 1 is a block diagram of a system for updating and validating data stored in a database, according to some embodiments.

Provided herein are system, apparatus, device, method and/or computer program product embodiments, and/or combinations and sub-combinations thereof, updating and validating data stored in a database.

As described above, entities frequently maintain inventory records of items available at various third-parties. The entities rely on the third-party system to provide them with inventory records. However, conventional systems that maintain inventory records of items available at various third parties may be error-prone, and updating such records may be time-consuming and unreliable.

For example, an entity may maintain inventory records of the third-parties (e.g., retailers, car dealerships, or the like). The entity may use the inventory data to provide its users with inventory information. However, conventional systems may receive updates about the inventory data once a day or once every few hours. In the fast-moving world of e-commerce, a given third-party's inventory data may change drastically within minutes. Therefore, the financial institution may not have the current inventory records of the given third party available when attempting to generate a loan offer or provide its user with the inventor's information.

The method, system, and non-transitory computer-readable medium embodiments described herein solve these problems by extracting real-time inventory data from a third-party's website. In an embodiment, a server may receive an HTML file including the content of a third-party website controlled by a third party from a web-component. The content may include a first set of data associated with an item. The web-component may be configured to extract the content of the third-party website and generate the HTML file in response to executing code embedded in the third-party website. Moreover, the server may receive a new HTML file each instance the third-party website is loaded on a user device. The server may map the first set of data associated with the item to a set of fields of a database and retrieve a second set of data associated with the item available at the third-party from the database. The server may identify a difference between the mapped first set of data and the second set of data based on a comparison of the mapped first set of data and the second set of data and execute an action in the database to update the second set of data based on a difference between the mapped first set of data and the second set of data.

This configuration allows for the server to receive information about the item from the third-party website each time the third-party website is loaded on a user device. By doing so, the server repeatedly receives updates about the items available at the third party without having to prompt the third-party or wait for the third party to provide the updates. This allows for an entity associated with the server to access current and accurate information about the items available at the third-party (e.g., to generate loan offers or provide the information to its users).

FIG. 1 is a block diagram of a system for updating and validating data in a database, according to some embodiments. In an embodiment, the system can include a server 100, user device 120, and database 130. User device 120 may be configured to access first website 110 and second website 125. First website 110 and second website 125 may be in communication with server 100. Server 100 may be in communication with database 130.

First website 110 may be hosted by a third-party server and may be accessible to user device 120 through a portion of the Internet or other network. Second website 125 may be hosted by server 100 or a different server and may be accessible to user device 120 through a portion of the Internet or other network. Second website 125 may be associated with server 100. Server 100 may be in communication with first website 110 and second website 125 through a different or same portion of the Internet or some other network.

Server 100 and database 130 can be connected through wired connections, wireless connections, or a combination of wired and wireless connections. As an example, server 100 and database 130 can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

User device 110 may be configured to access first website 110 or second website 125 through an application executing on user device 120, such as an internet browser. In some embodiments, user device 110 may be configured to access first website 110 using a web-based application executing on user device 110.

First website 110 may be a third-party website. First website 110 may include information about one or more items available at the third party. An entity associated with server 100 may provide an executable code to the administrator of first website 110. The executable code may be embedded in first website 110 as a web-component 112.

Web-component 112 may include instructions to include a GUI element on first web site 110 each time first website 110 is loaded on user device 120. Web-component 112 may also include instructions to execute an automated script each time first website 110 is loaded on user device 120. The automated script may be configured to execute a web-scraping algorithm to scrape the content of the webpage and generate an HTML file including the content of the webpage. For example, web-component 112 may implement a SCRAPY application developed in Python. The SCRAPY application is a web-crawler framework that is configured to scrape data from websites. First website 110 may be configured to transmit the HTML file to server 100 each time an HTML file is generated. That is, web-component 112 may be executed each time first website 110 is loaded on user device 120. In some embodiments, web-component 112 may not render a GUI element and may execute the automated script in the background.

In various embodiments, the GUI element on first website 110 may include information about one or more items on the webpage of first website 110 in the properties of the GUI element. Moreover, first website 110 may include a GUI element for each item rendered on first website 110. Each GUI element may include information about the respective item associated with the GUI element.

Web-component 112 may generate an HTML file each time a webpage of first website 110 is loaded on user device 120. The HTML file may include item data about the items included on the webpage, as stored in the properties of the GUI element corresponding to web-component 112. Alternatively, the HTML file may include content scrap ed from the webpage. Web-component 112 may be configured to transmit the HTML file to server 100 each time an HTML file is generated.

As a non-limiting example, first website 110 may be a car dealership's website configured to render information about vehicles available for sale at the car dealership. The entity associated with server 100 may be a financial institution, which provides loans for purchasing vehicles from the car dealership. The entity may provide an executable code to the car dealership, to be embedded on first website 110 (e.g., the car dealership's website). Once embedded in first website 110, the executable code may be a web-component 112. The web-component 112 may include instructions for rendering a GUI element (e.g., a button) on first website 110 (e.g., the car dealership's website). The user may select the GUI element to transmit a request to generate a loan. Web-component 112 may include instructions to execute an automated script, which is configured to extract the content of the webpage of first website 110 (e.g., the car dealership website) and generate an HTML file including the content of the webpage of first website 110. The content may include information about the vehicles for sale at the car dealership. Web-component 112 may include instructions to transmit the HTML file to server 100.

Server 100 may receive an HTML file including the content of the third-party website from web-component 112. The content may include a first set of data about items available at the third-party. Analysis engine 102 may identify the items in the first set of data. Analysis engine 102 may also identify the third party based on the HTML file. For example, the HTML file may include an identifier of first website 110 or the third-party.

Analysis engine 102 may map the first set of data associated with the items to a set of fields of database 130. Moreover, Analysis engine 102 may retrieve a second set of data associated with the items available at the third-party from database 130 based on the identified items and the identified third-party. The second set of data may correspond to the identified items from the content. Analysis engine 102 may identify a difference between the mapped first set of data and the second set of data based on a comparison of the mapped first set of data and the second set of data, and execute an action in database 130 to update to the second set of data based on a difference between the mapped first set of data and the second set of data.

Database 130 may be one or more data storage devices configured to store data. More specifically, database 130 may be configured to store data associated with items available at various third-parties. As a non-limiting example, the items may be vehicles available at a car dealership. The data stored in database 130 may include, make of a vehicle, model of the vehicle, year of the vehicle, price of the vehicle, color of the vehicle, quantity of the vehicle available at the car dealership, or the like.

Second website 125 may be configured to render the data associated with various third-parties stored in database 130. As a non-limiting example, second website 125 may be used to transmit requests to generate pricing structures for loan offers for an item available at a given third-party. Second web site 125 may transmit the requests to server 100 or a different server to generate the pricing structures. Server 100 or the different server may transmit the pricing structures to second website 125.

Figure 2:
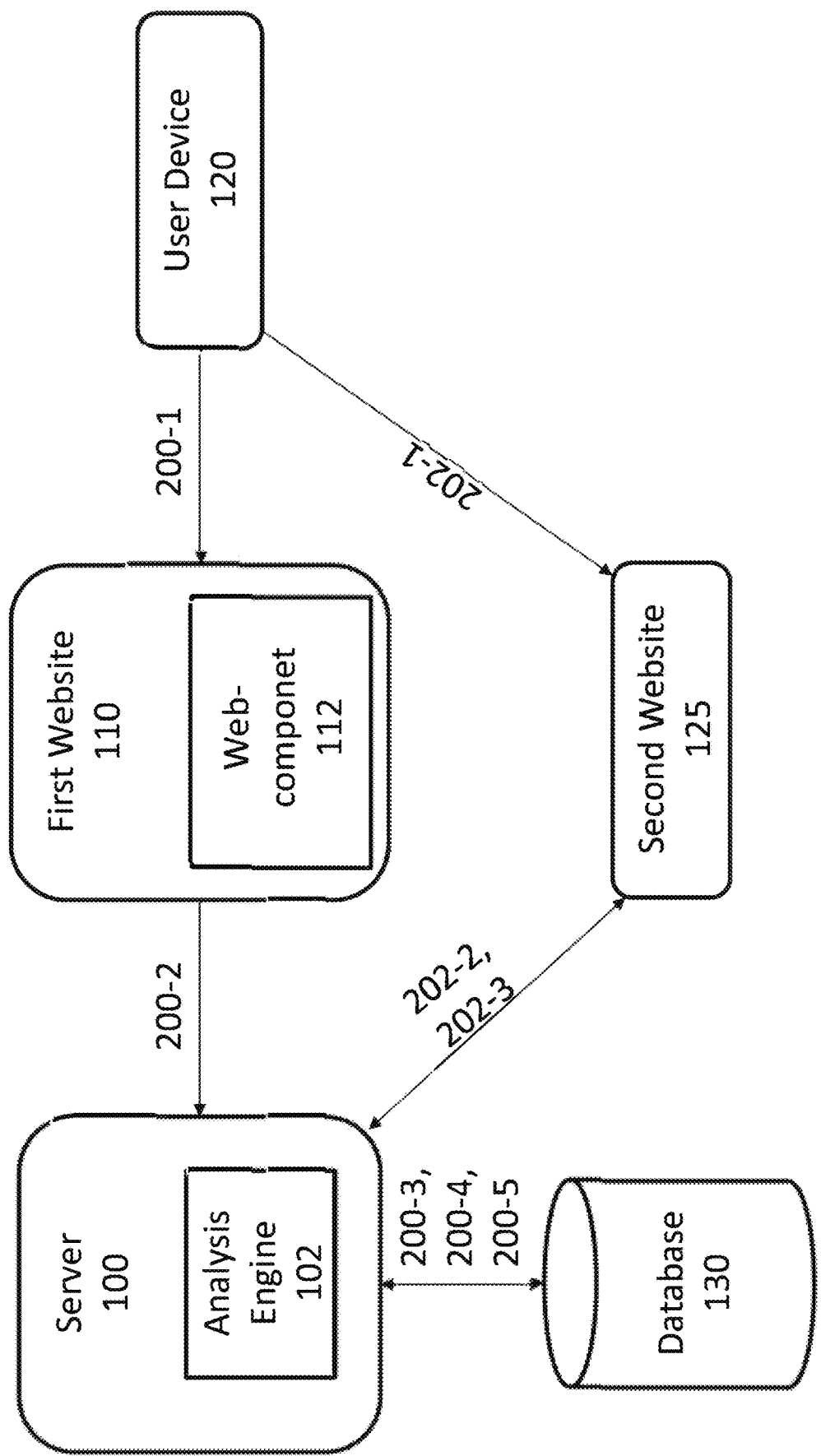
FIG. 2 is a block diagram illustrating the data flow in the system for updating and validating data stored in the database, according to some embodiments.

FIG. 2 is a block diagram illustrating the data flow in the system for updating and validating data stored in the database, according to some embodiments. In a given embodiment, user device 120 transmits a request 200-1 to access first website 110. As indicated above, first website 110 may be a third-party website, unaffiliated with server 100. As a non-limiting example, first website 110 may be a car dealership's website.

First website 110 may be rendered on a display of user device 120. In response to being loaded onto user device 120, web component 112 may execute a web-scraping algorithm to scrape the content of the webpage of first website 110 loaded on user device 120. Web-component 112 may cause first website 110 to render a GUI element, such as a button on a webpage of first website 110. In various embodiments, web-component 112 may capture information about the item (e.g., vehicle) from the properties of the GUI element corresponding to web-component 112. Web-component 112 may generate an HTML file including the content. The content may include the information the item as scraped from the webpage or captured from the properties of the GUI element.

The content may include strings and image HTML tags displayed on the respective webpage of first website 110. For example, if first website 110 is a car dealership's website, the content can include information about vehicles for sale displayed on the respective webpage of first website 110. The content may include vehicle names, make, models, year, price, color, VIN, quantity, or the like. The HTML file may also include an identifier of the third-party associated with first website 110. For example, the HTML file may include an identifier of the car dealership.

Web-component 112 may transmit the HTML file to server 100 in request 200-2. Server 100 may receive the HTML file, and analysis engine 102 may parse the HTML file and map the content of the HTML file to database fields of database 130. More specifically, analysis engine 102 may identify strings in the HTML file that correspond to database fields of database 130. For example, database 130 may include fields such as vehicle names, make, models, year, price, color, VIN, quantity, or the like. Analysis engine 102 may identify strings such as Honda, civic, 2015, $10,000, black, etc. In some embodiments, analysis engine 102 may identify the strings in the HTML file based on similar strings being stored in database 130. For example, analysis engine 102 may identify the string "Honda" because database 130 includes database values with the same string under the "Make" database field. In some embodiments, analysis engine 102 may identify strings in the HTML content based on predefined rules. The predefined rules may be instructions to identify strings corresponding to a list of predetermined makes, models, years, colors, or the like. Moreover, the predefined rules may identify strings based on a specific format, such as currency, VIN, quantity, date, or the like.

Analysis engine 102 may use the third-party identifier to retrieve information about items (e.g., vehicles) available at the third party from database 130 by transmitting request 200-3 to database 130. Database 130 may return the information about the items available at the third party in response 200-4. Analysis engine 102 may compare the information about the items received in response 200-4 with the mapped content of the HTML file to identify any differences between the information about the items stored in database 130 and the mapped content of the HTML file. Analysis engine 102 may transmit request 200-5 to update database 130 based on the identified difference between the information about the items stored in database 130 and the mapped content of the HTML file so that the information stored about the items in database 130 matches the mapped content of the HTML file.

For example, analysis engine 102 may retrieve the inventory of a car dealership from database 130. Analysis engine 102 may compare the car dealership's inventory with the mapped content of the HTML file to identify any differences between the inventory of the car dealership stored in database 130 and the mapped content of the HTML file. Analysis engine 102 may identify differences in the vehicles available at the car dealership based on the content of the HTML file. The differences can include newly added vehicles to the inventory, fewer vehicles of a given type, additional vehicles of a given type, discrepancies of information about the vehicles, etc.

The difference may be to certain elements of information about a vehicle stored in database 130. Additionally, the difference may be new vehicles added to a car dealership's inventory or vehicles removed from a car dealership's website.

To identify a difference, analysis engine 102 first confirms whether a database entry for a particular vehicle already exists for the car dealership. For example, the mapped content of the HTML file may include information about two vehicles, vehicle 1 and vehicle 2. A database entry for vehicle 1 may already exist in database 130. However, vehicle 2 may be a newly added vehicle by the car dealership for which a database entry does not exist in database 130. Analysis engine 102 may confirm that a database entry already exists for vehicle 1 by comparing the other information about vehicle 1 in the mapped content of the HTML file and the inventory of the car dealership retrieved from database 130.

In some embodiments, analysis engine 102 uses a combination of different elements of the information about vehicle 1 in the mapped content of HTML file and the inventory of the car dealership retrieved from database 130 to verify that a database entry exists for vehicle 1 in database 130. The elements may include VIN, make, model, year, color, price, quantity, etc. Analysis engine 102 may assign weights to different elements of the information about vehicle 1. The weights may indicate whether a given element of the information is unique to the vehicle and can identify the vehicle. For example, in the event a VIN and the color of vehicle 1 are included in the mapped content of the HTML file, the VIN may hold a greater weight than the color of vehicle 1 since the VIN is a more distinctive type of data than color. Similarly, analysis engine 102 may assign weights to information about vehicle 1 such as make, model, year, price, or the like.

Analysis engine 102 may compare the information about vehicle 1 in the mapped content of the HTML file and the data about vehicle 1 in the inventory of the car dealership retrieved from database 130. Analysis engine 102 may generate a score based on the amount of information that matches between the information about vehicle 1 in the mapped content of the HTML file and the data about vehicle 1 in the inventory of the car dealership retrieved from database 130 and the assigned weights. For example, if analysis engine 102 determines that the year, make, model, and color of vehicle 1 included in the mapped content of the HTML file match the year, make model, and color of vehicle 1 included in the data of vehicle 1 in the inventory of the car dealership retrieved from database 130, analysis engine 102 may generate a score based on the weights assigned to year, make, model, and color. If the generated score is greater than a predetermined threshold score, then analysis engine 102 can verify that a database entry exists for vehicle 1 in database 130.

In response to determining that a database entry for vehicle 1 exists in database 130, analysis engine 102 may determine whether there are any differences between elements of information about vehicle 1 in the mapped content of the HTML file and the data about vehicle in the inventory of the car dealership retrieved from database 130. The elements of the information can include VIN, make, model, year, color, price, quantity, etc. For example, analysis engine 102 may determine that the year, make, model, and color match between the information about vehicle 1 in the mapped content of HTML file and the data about vehicle 1 in the inventory of the car dealership retrieved from database 130. However, the car dealership has lowered the price of vehicle 1 and so the analysis engine 102 may determine that the price of vehicle 1 does not match between the information about vehicle 1 in the mapped content of the HTML file and the data about vehicle 1 in the inventory of the car dealership retrieved from database 130. In response to determining the difference between the information about vehicle 1 in the mapped content of the HTML file and the data about vehicle in the inventory of the car dealership retrieved from database 130, analysis engine 102 may transmit request 200-5 to database 130 to update the price of vehicle 1 to match the price of vehicle 1 included in the data about vehicle in the inventory of the car dealership retrieved from database 130. In doing so, database 130 has the most current and accurate information about vehicle 1 and the car dealership inventory.

As indicated above, the content of the HTML file may also include information about vehicle 2, which does not correspond to a database entry in database 130. Analysis engine 102 may determine that database 130 does not include a database entry for vehicle 2, and vehicle 2 is newly added to the car dealership's inventory. As such, analysis engine 102 may transmit request 200-5 to database 130, and add a new database entry for vehicle 2 in the inventory of the car dealership stored database 130.

In some embodiments, analysis engine 102 may transmit an alert to the car dealership to verify any detected differences between the mapped content of the HTML file and the inventory of the car dealership. Analysis engine 102 may transmit request 200-5 to update database 130 in response to receiving a verification from the car dealership.

In some embodiments, analysis engine 102 may use the inventory of various car dealerships to determine various analytical data about the vehicles. The analytical data may include trends about various attributes. Analysis engine 102 may use the inventory of various car dealerships to determine a trend about a type of vehicle (e.g., sports utility vehicles (SUV), sedans, coupes, etc.), a specific car dealership, a geographic region (e.g., city, county, state, country, east coast, west coast, mid-Atlantic, etc.), a specific make of a car (e.g., Honda, Mercedes, Lexus, etc.), etc. The trend may indicate whether certain vehicles are being sold from certain car dealerships more than other vehicles over a period of time.

For example, analysis engine 102 may determine that a specific type of vehicle is being sold more than other types of vehicles in certain geographic regions. Similarly, analysis engine 102 may determine that vehicles of a given price range are being sold more than vehicles of other price ranges in a given geographic region. Analysis engine 102 may also determine the number of vehicles being purchased in different portions of the year, based on an inventory of various car dealerships over a period of time.

Analysis engine 102 may provide the analytics data about the vehicles to the dealerships. Analysis engine 102 may also generate recommendations of vehicles to users that access second website 125. For example, server 100 and second website 125 may be associated with a financial institution. The financial institution may provide loans for vehicles for sale at various car dealerships. Second website 125 may provide a platform for searching vehicles for sale at various car dealerships.

A user may access second website 125 by transmitting request 202-1 to second website 125 using user device 120. Second website 125 may be rendered on user device 120. For example, second website 125 may be rendered on an internet browser or application of user device 120. Second website 125 may capture information about user device 120, with the consent of the user. For example, second website 125 may capture the user device's location. Alternatively, a user may provide authentication details to second website 125 using user device 120. Second website 125 may use the authentication details to retrieve user information. Moreover, user device 120 may transmit a search request to second website 125. The search request may be for vehicles for sale in a geographic area. Second website 125 may transmit the request 202-2 to generate a recommendation of vehicles to server 100. Request 202-2 may include information such as the search query parameters, user information, location, etc.

Analysis engine 102 may generate recommendations of vehicles for the user based on the information included in request 200-2 and the analytical data. For example, in the event the information included in request 200-2 includes a geographic region of the user device and a price range (retrieved based on user information), analysis engine 102 may identify vehicles of a make and model that are popular in the geographic region, are within the price range and are available at car dealerships in the geographic region based on the inventory of various car dealerships stored in database 130 and the analytical data. Analysis engine 102 may return the recommendation of vehicles in response 200-3 to second website 125. Second website 125 may display the recommendation of vehicles.

In some embodiments, second website 125 may be used to transmit requests to generate loan offers or prequalification results for selected vehicles. The requests may be transmitted to server 100 or a different server responsible for generating the loan offers or prequalification results for the selected vehicles. Server 100 or the different server may use the inventories of the various car dealerships stored in database 130 to retrieve information about the selected vehicles to generate the loan offers or prequalification results.

Figure 3:
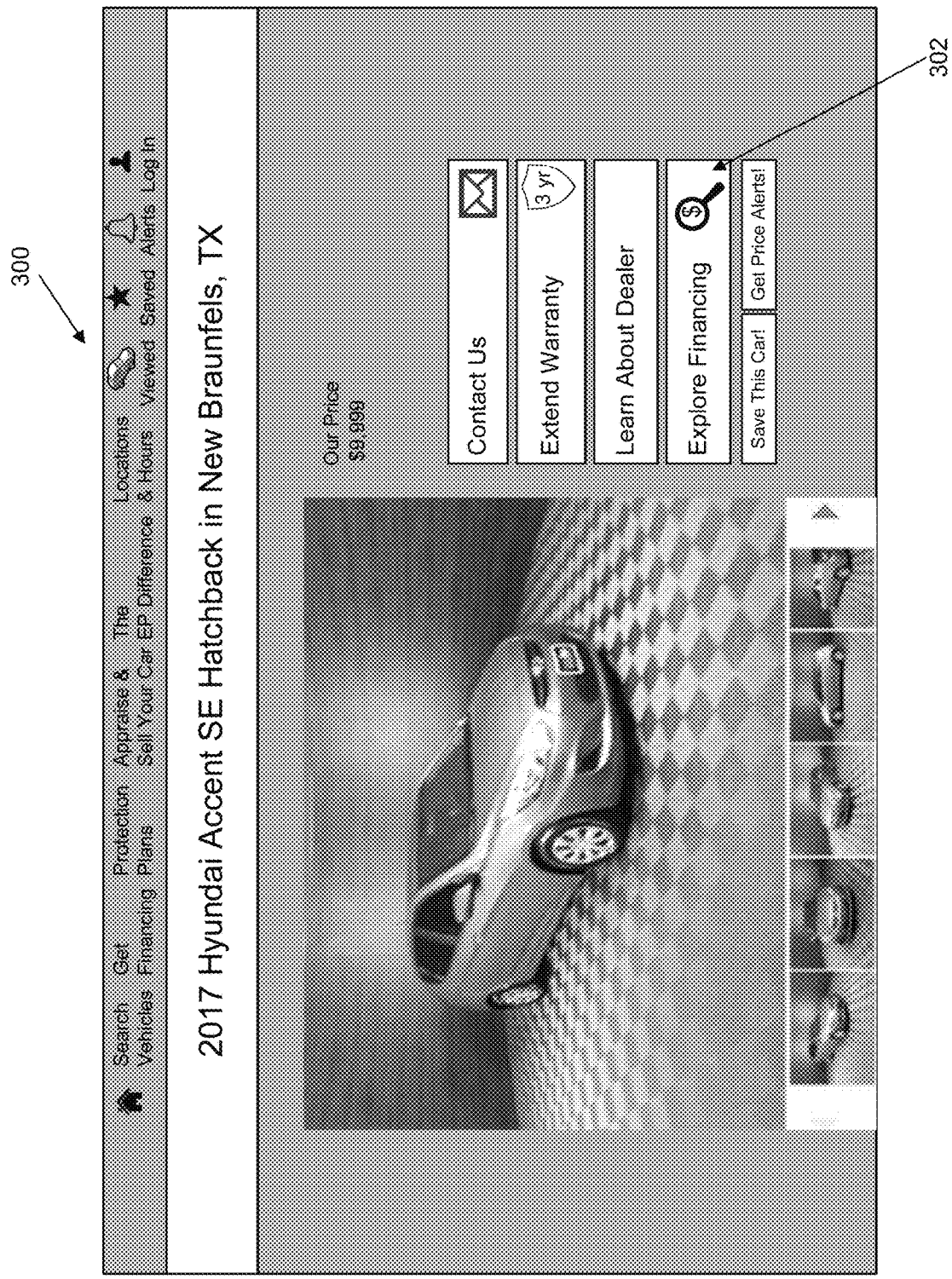
FIG. 3 illustrates a graphical user interface of a third-party website, according to some embodiments.

FIG. 3 illustrates a graphical user interface of a third-party website, according to some embodiments. FIG. 3 shall be described with reference to FIG. 1. As a non-limiting example, the third-party website (e.g., first website 110) can be a car dealership's website. The car dealership's website may execute web-component 112. Furthermore, the car dealership's website may include multiple webpages, including webpage 300. The car dealership's website may be displayed on user 120.

The web-component may be configured to render button 302 each time webpage 300 is loaded. In some embodiments, the web-component may be configured to render button 302 or another GUI element on other webpages of the car dealership's website. Web-component 112 may be configured to use a web-scraping algorithm to scrape the content on webpage 300 and generate an HTML file including the content. Web-component 112 can transmit the HTML file to a server (e.g., server 100, as shown in FIG. 1).

Webpage 300 may include information about a single vehicle. For example, webpage 300 may be displayed in response to a user selecting a vehicle from a different webpage of the car dealership's website. As such, the content may include information about the single vehicle. The content may include the make, model, price, year, VIN, or the like.

Web-component 112 may be configured to execute a web-scraping algorithm to scrape the content of other webpages of the car dealership's website in response to each of the other webpages loading on the user device. The other webpages may include information about multiple vehicles (e.g., a webpage that displays search results including multiple vehicles). As a result, the content scraped by the web-component may include information about the multiple vehicles.

The car dealership's website may include various links or buttons related to the purchase of the product. One of the links or buttons may include a button 302. Button 302 may be associated with transmitting a prequalification request for a loan for purchasing the specified product. In an embodiment, button 302 may be associated with transmitting a prequalification request for a loan for purchasing multiple products. In an embodiment, button 302 may be associated with each of a plurality of items (e.g., vehicles) displayed on webpage 300 to enable user selection of a product-specific prequalification request for any one or more of the displayed plurality of items.

In response to the actuation of button 302, the web-component can launch a website (e.g., second website 125) to be rendered within webpage 300. The website can be used to transmit a request to generate loan offers or prequalification results for the item(s) displayed on webpage 300.

In some embodiments, the website may be associated with server 100. For example, the website can be hosted by server 100 or can be associated with the same entity that manages server 100. Web-component 112 may execute the web-scraping algorithm to scrape the content of webpage 300 and generate an HTML file including the content in response to a user actuating button 302. Web-component 112 may transmit the HTML file to server 100 or another server responsible for generating the loan offers or prequalification results while launching the website.

Figure 4:
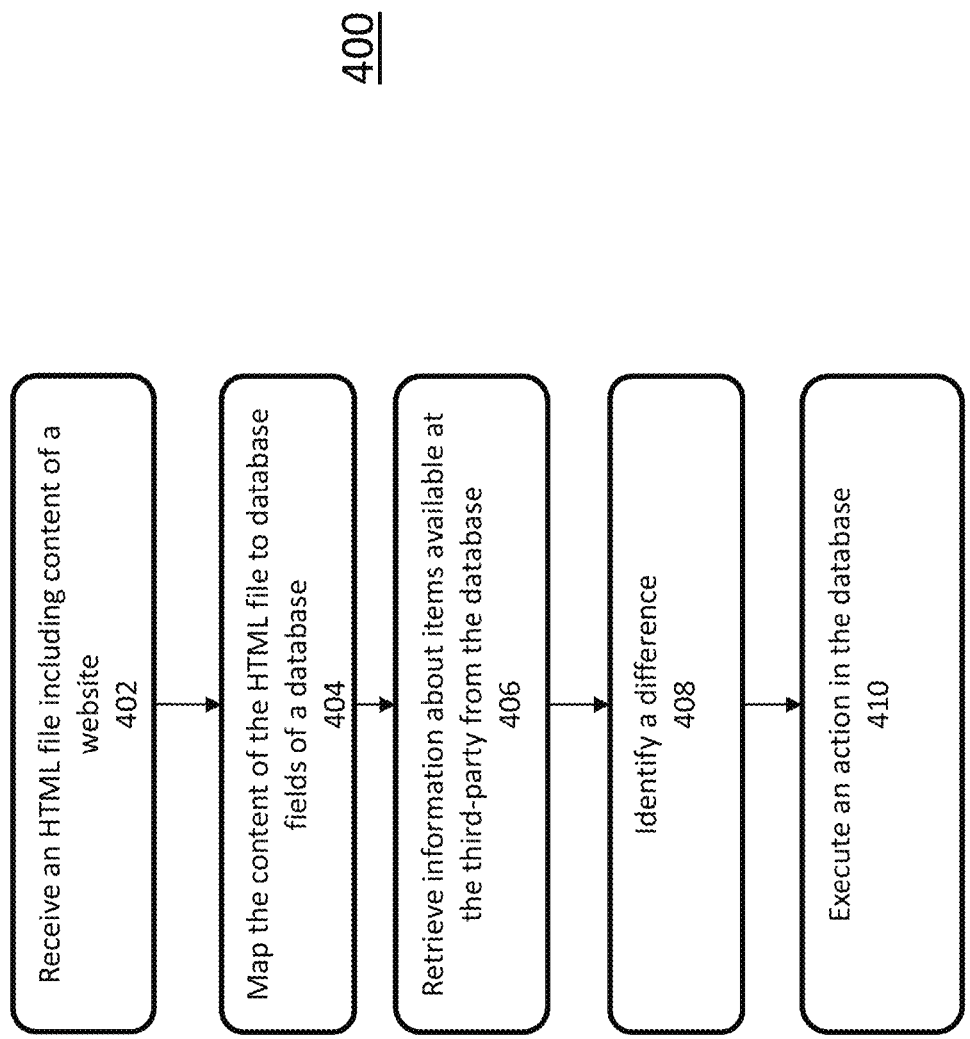
FIG. 4 is a flowchart illustrating a process for updating and validating data stored in a database, according to some embodiments.

FIG. 4 is a flowchart illustrating a process for validating and updating data stored in a database, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to those example embodiments.

In operation 402, server 100 receives an HTML file including content from first website 110. First website 110 may include web-component 112, which is configured to execute an automated script in response to first website 110 loading on user device 120. More specifically, web-component 112 may execute the automated script in response to one or more webpages of first website 110 loading on user device 120. The automated script may be a web-scraping algorithm configured to scrape the content of a given webpage of first website 110. First website 110 may be a third-party website configured to display items available at the third party. For example, first website 110 may be a car dealership's website including vehicles for sale at the car dealership.

In operation 404, analysis engine 102 maps the content of the HTML file to database fields of database 130. Database 130 may be configured to store information about items available at different third-parties. For example, database 130 may be configured to store the inventory of various car dealerships. Database 130 may include specific database fields (e.g., make, model, year, price, etc.) corresponding to the different types of data included in the inventory of various car dealerships. Analysis engine 102 may identify strings in the content of the HTML file based on predefined rules that correspond to the respective database fields based on predefined rules.

In operation 406, analysis engine 102 retrieves information about items available at the third-party from database 130 using the third-party identifier. The identifier may be included in the HTML file. For example, analysis engine 102 may use a car dealership's identifier to retrieve the car dealership's inventory in database 130.

In operation 408, analysis engine 102 identifies a difference between the mapped content of the HTML file and the information about the items available at the third-party retrieved from database 130. Analysis engine 102 may determine whether an item included in the mapped content of the HTML file is included in the information about the items available at the third-party retrieved from database 130. In response to determining that the item is included in the information about the items available at the third-party retrieved from database 130, analysis engine 102 may identify a difference in the information for the item in the mapped content of the HTML file and the information about the items available at the third-party retrieved from database 130. The difference may be between an element of the information for the item in the mapped content of the HTML file and an element of information about the items available at the third-party retrieved from database 130. For example, in the event the item is a vehicle, analysis engine 102 may determine that the vehicle's price is different in the mapped content of the HTML file compared to the price of the same vehicle in the inventory of the car dealership retrieved from database 130. In response to determining that the item is not included in the information about the items available at the third-party retrieved from database 130, analysis engine 102 may determine that the item is a new item added by the third-party.

In operation 410, analysis engine 102 executes an action in database 130 to update information about the item available at the third-party based on an identified difference in the information about the item in the mapped content of the HTML file and the information about the item stored in database 130. Analysis engine 102 may determine that information about the item available at the third-party already exists in database 130, and the identified difference is between an element of the information for the item in the mapped content of the HTML file and an element of information about the items available at the third-party retrieved from database 130. Analysis engine 102 may update database 130 so that the element of information about the item available at the third-party stored from database 130 matches the element of the information for the item in the mapped content of the HTML file. For example, if analysis engine 102 determines the price of the vehicle at the car dealership is different in the mapped content of the HTML file as compared to the price of the vehicle at the car dealership in the information about the vehicle stored in database 130, analysis engine 102 may update the price of the vehicle at the car dealership in database 130 to match the price of the vehicle at the car dealership in the mapped content of the HTML file.

If analysis engine 102 determines that the item is not included in database 130, analysis engine 102 may determine that the item is a new item available at the third-party. Therefore, analysis engine 102 may create a new database entry for the item in database 130. The database entry may include the information about the item in the mapped content of the HTML file.

Figure 5:
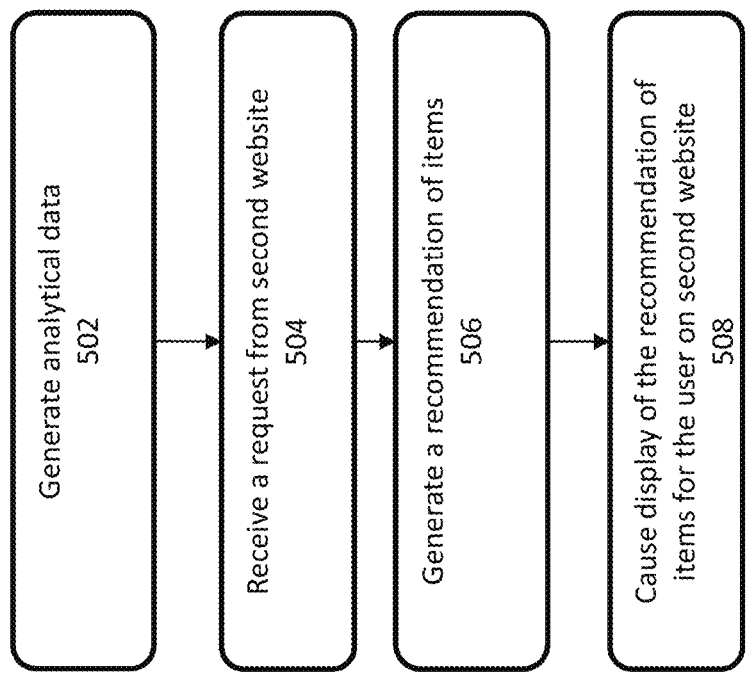
FIG. 5 is a flowchart illustrating a process for generating a recommendation of items for a user, according to some embodiments.

FIG. 5 is a flowchart illustrating a process for generating recommendations for a user based on analytical data, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to those example embodiments.

In operation 502, analysis engine 102 generates analytical data associated with items available at a third-party based on information about items available at the third-party stored in database 130. The analytical data may include trends about various attributes. For example, analysis engine 102 may use the inventories of various car dealerships to determine a trend about a type of vehicle (e.g., sports utility vehicles (SUV), sedans, coupes, etc.), a specific car dealership, a geographic region (e.g., city, county, state, country, east coast, west coast, mid-Atlantic, etc.), a specific make of a car (e.g., Honda, Mercedes, Lexus, etc.), etc. The trend may indicate whether certain vehicles are being sold from certain car dealerships more than other vehicles over a period of time.

In operation 504, server 100 receives a request from second website 125 to generate a recommendation of items for a user, in response to the user interacting with second website 125 using user device 120. The request may include a search query received from user device 120, information about the user, the user's location, or the like.

In operation 506, analysis engine 102 generates a recommendation of items for the user using the items available at various third-parties and the analytical data. For example, in the event a geographic region and a price range are included in the request, analysis engine 102 may identify vehicles of a make and model that are popular in the geographic region, are within the price range, and are available at car dealerships in the geographic region based on the inventory of various car dealerships stored in database 130 and the analytical data. Analysis engine 102 may transmit the recommendation of items to second website 125.

In operation 508, analysis engine 102 causes the display of the recommendation of items for the user on second website 125. In some embodiments, the recommendation of items may be in response to a search request. Alternatively, the recommendation of items may be displayed on the second website as the user performs a different task (e.g., apply for a loan).

Figure 6:
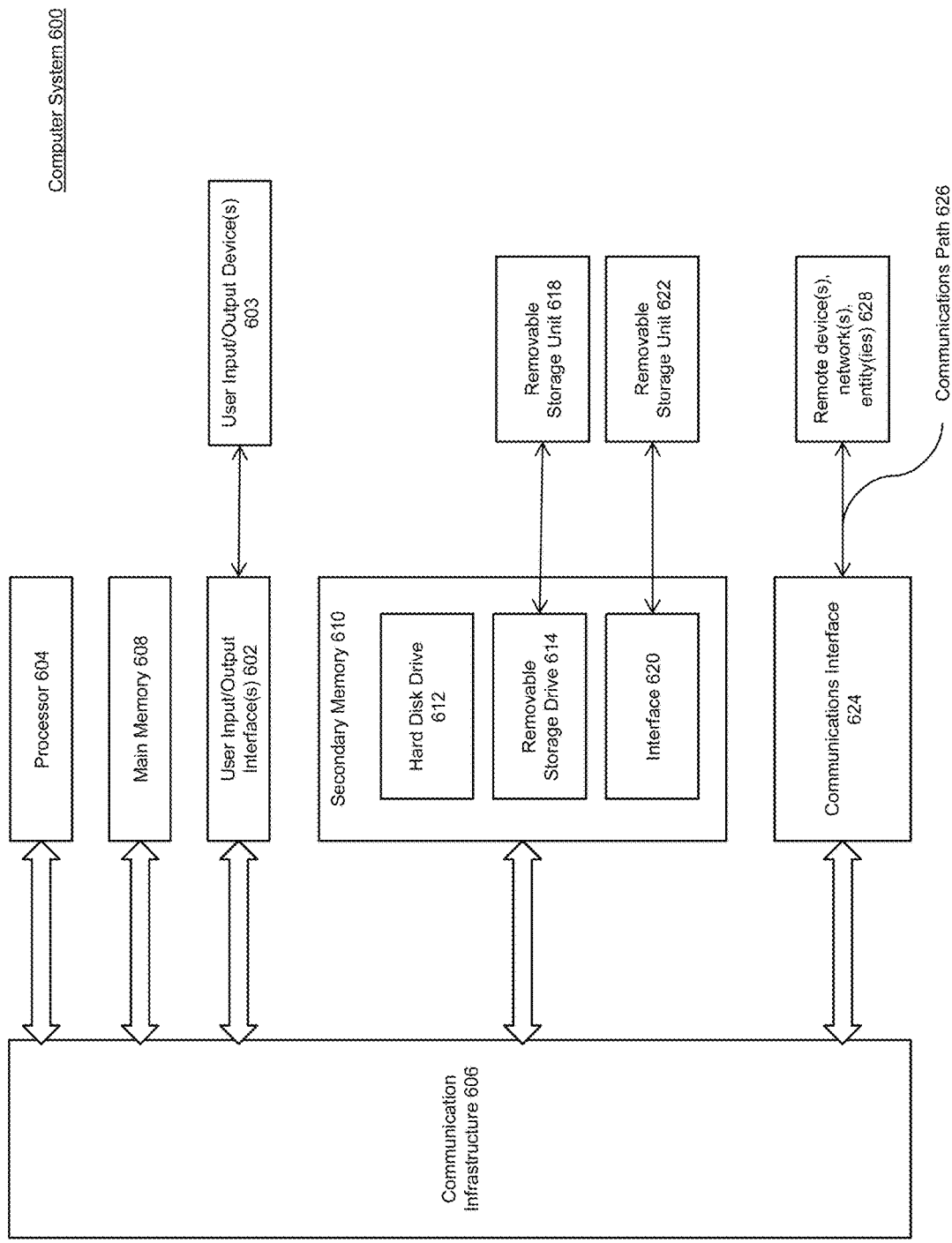
FIG. 6 is an example computer system useful for implementing various embodiments.

Various embodiments can be implemented, for example, using one or more computer systems, such as computer system 600 shown in FIG. 6. Computer system 600 can be used, for example, to implement methods 400 of FIG. 4 and 500 of FIG. 5. Furthermore, computer system 600 can be at least part of server 100, user device 120, and database 130, as shown in FIG. 1. For example, computer system 600 route communication to various applications. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer database. Removable storage drive 614 reads from and/or writes to removable storage unit 618 in a well-known manner.

According to an exemplary embodiment, secondary memory 610 can include other means, instrumentalities, or other approaches for allowing computer programs and/or other instructions and/or data to be accessed by computer system 600. Such means, instrumentalities, or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving, by one or more computing devices, an HTML file including content of a third-party website controlled by a third party from a web-component, the content including a first set of data associated with an item and a geographic location of the third-party, wherein the web-component executes a web-scraping algorithm to extract the content of the third-party website and generate the HTML file in response to executing code embedded in the third-party website, and wherein a new HTML file is received each instance the third-party website is loaded on a user device;

mapping, by the one or more computing devices, the first set of data associated with the item to a set of fields of a database;
retrieving, by the one or more computing devices, a second set of data associated with the item available at the third-party website from the database;
identifying, by the one or more computing devices, a difference between the mapped first set of data and the second set of data based on a comparison of the mapped first set of data and the second set of data;
executing, by the one or more computing devices, an action in the database to update the second set of data based on the difference between the mapped first set of data and the second set of data;
identifying, by the one or more computing devices, a trend attribute associated with the item or the geographic location of the third party based on the first set of data;
identifying, by the one or more computing devices, a new item with similar characteristics as the item in response to identifying the trend attribute associated with the item or the geographic location of the third party; and
rendering, by the one or more computing devices, information about the new item on a different website in response to a user located in the geographic location of the third-party interacting with the different website.

2. The computer-implemented method of claim 1, further comprising:
storing, by the one or more computing devices, a plurality of data sets associated with the item, including the first set of data received from the third-party website, over a period of time; and
identifying, by the one or more computing devices, the trend attribute associated with the item or the third party within the period of time based on the plurality of data sets.

3. The computer-implemented method of claim 1, further comprising transmitting, by the one or more computing devices, an alert to the third party to confirm the difference between the first set of data and the second set of data.

4. The computer-implemented method of claim 1, wherein the difference corresponds to a value in at least one field of the set of fields of the database.

5. A system comprising:
a memory;
a processor coupled to the memory, the processor configured to:
receive an HTML file including content of a third-party website controlled by a third party from a web-component, the content including a first set of data associated with an item and a geographic location of the third party, wherein the web-component executes a web-scraping algorithm to extract the content of the third party website and generate the HTML file in response to executing code embedded in the third-party website, and wherein a new HTML file is received each instance the third-party website is loaded on a user device;
map the first set of data associated with the item to a set of fields of a database; retrieve a second set of data associated with the item available at the third-party website from the database;
identify a difference between the mapped first set of data and the second set of data based on a comparison of the mapped first set of data and the second set of data;

execute an action in the database to update the second set of data based on the difference between the mapped first set of data and the second set of datai identify a trend attribute associated with the item or the geographic location of the third party based on the first set of data;

identify a new item with similar characteristics as the item in response to identifying the trend attribute associated with the item or the geographic location of the third party; and render information about the new item on a different website in response to a user located in the geographic location of the third party interacting with the different website.

6. The system of claim 5, the processor further configured to:

store a plurality of data sets associated with the item, including the first set of data received from the third-party website, over a period of time; and identify the trend attribute associated with the item or the third party within the period of time based on the plurality of data sets.

7. The system of claim 5, the processor further configured to transmit an alert to the third party to confirm the difference between the first set of data and the second set of data.

8. The system of claim 5, wherein the difference corresponds to a value in at least one field of the set of fields of the database.

9. A non-transitory computer-readable medium having instructions stored thereon, execution of which, by one or more processors of a device, causes the one or more processors to perform operations comprising:

receiving an HTML file including content of a third-party website controlled by a third party from a web-component, the content including a first set of data associated with an item and a geographic location of the third party, wherein the web-component executes a web-scraping algorithm to extract the content of the third party website and generate the HTML file in response to executing code embedded in the third-party website, and wherein a new HTML file is received each instance the third-party website is loaded on a user device;

mapping the first set of data associated with the item to a set of fields of a database;

retrieving a second set of data associated with the item available at the third-party website from the database;

identifying a difference between the mapped first set of data and the second set of data based on a comparison of the mapped first set of data and the second set of data;

executing an action in the database to update the second set of data based on the difference between the mapped first set of data and the second set of data;

identifying a trend attribute associated with the item or the geographic location of the third party based on the first set of data;

identifying a new item with similar characteristics as the item in response to identifying the trend attribute associated with the item or the geographic location of the third party; and rendering information about the new item on a different website in response to a user located in the geographic location of the third party interacting with the different website.

10. The non-transitory computer-readable medium of claim 9, the operations further comprising:

storing a plurality of data sets associated with the item, including the first set of data received from the third-party website, over a period of time; and identifying the trend attribute associated with the item or the third party within the period of time based on the plurality of data sets.

11. The non-transitory computer-readable medium of claim 9, the operations further comprising transmitting an alert to the third party to confirm the difference between the first set of data and the second set of data.

* * * * *